March 1, 1938.  W. C. BARNES ET AL  2,109,455
METHOD AND APPARATUS FOR DETECTING FLAWS IN METALLIC BODIES
Filed April 25, 1934  3 Sheets-Sheet 1
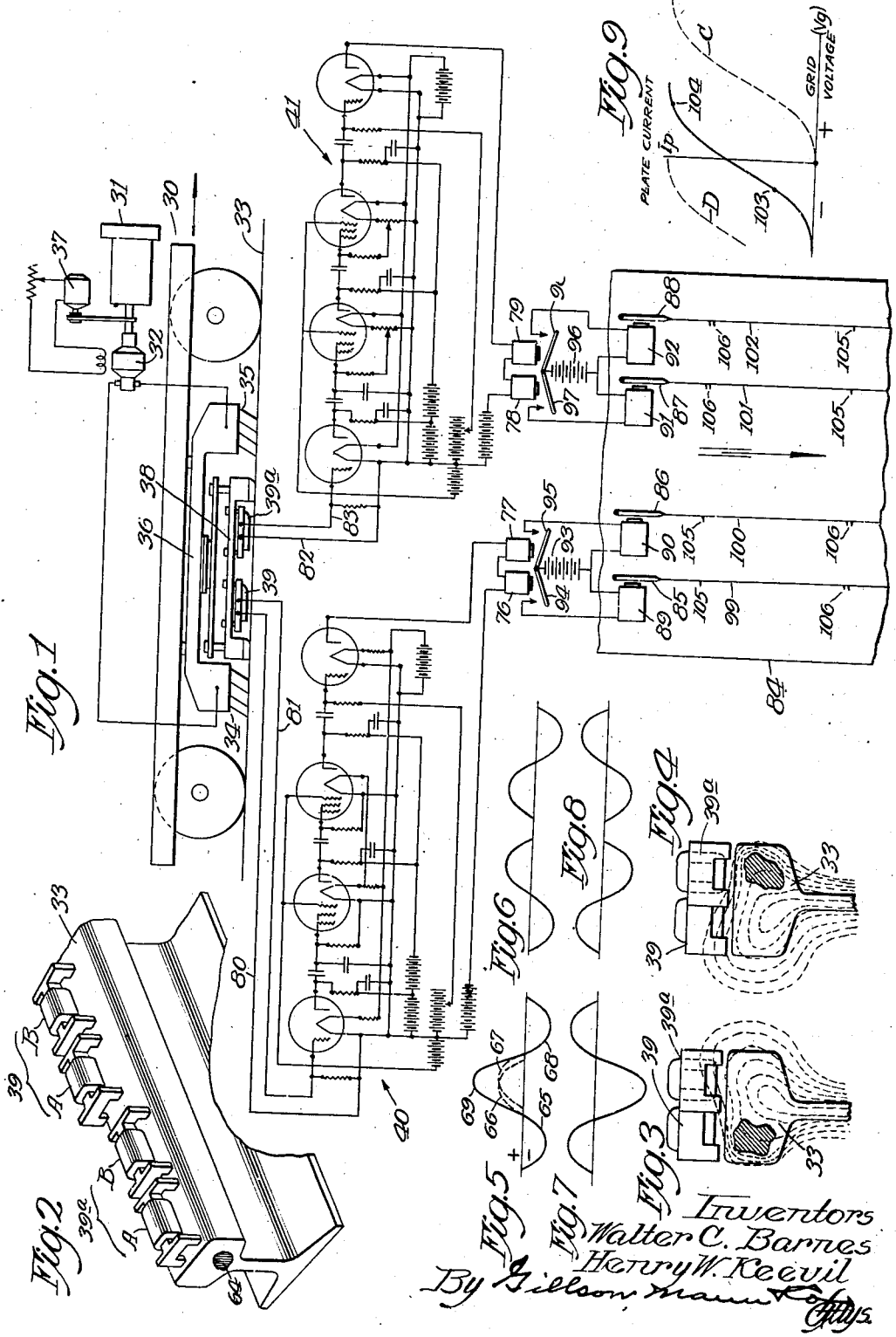
Inventors
Walter C. Barnes
Henry W. Keevil
By Gillson, ...
Attys.

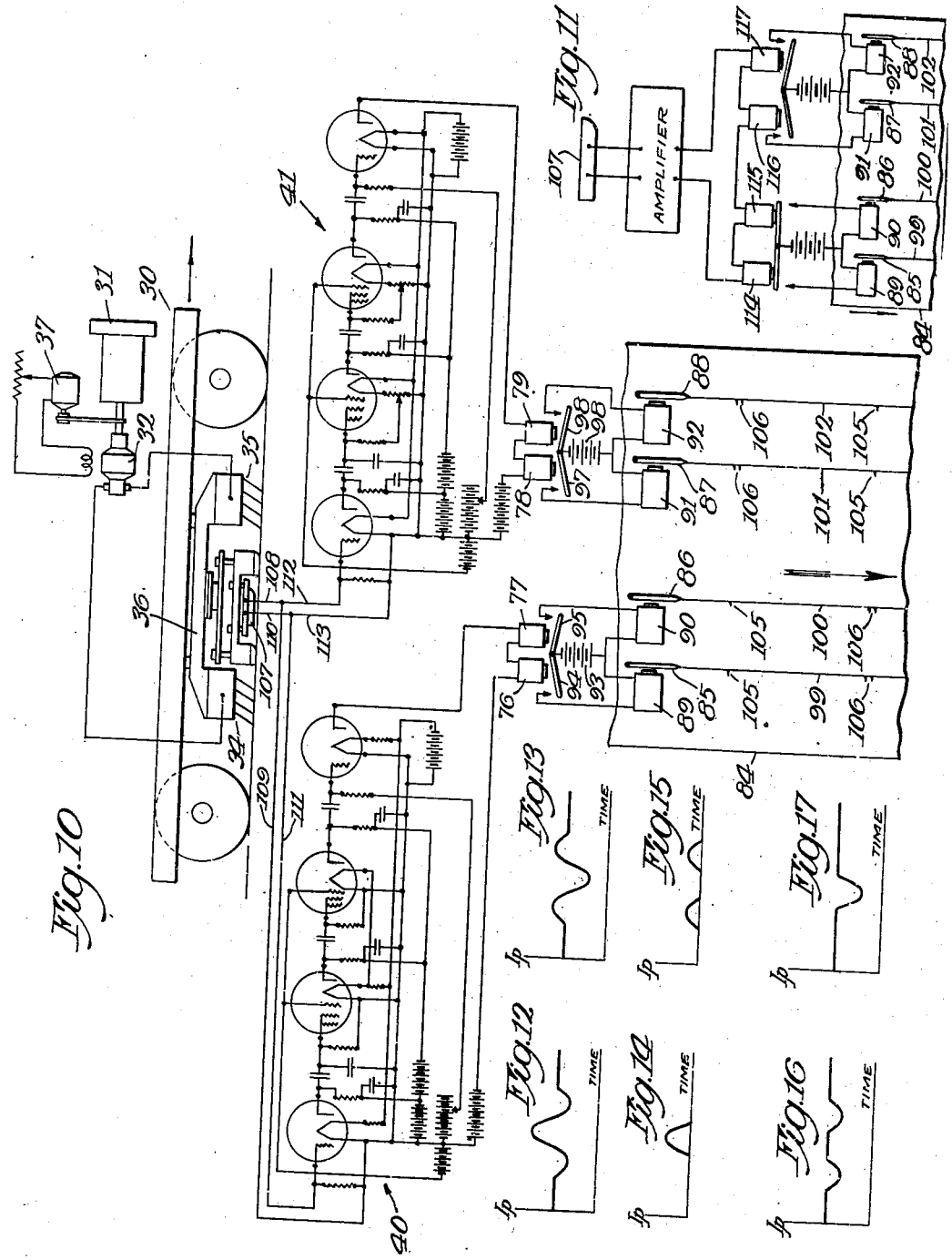

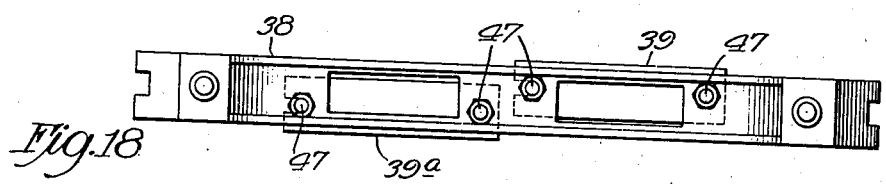
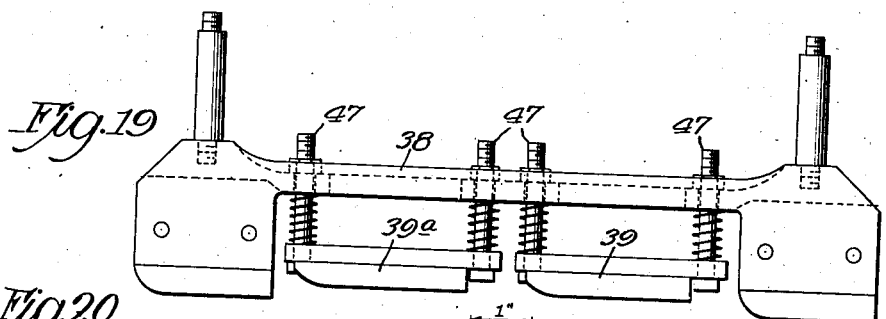
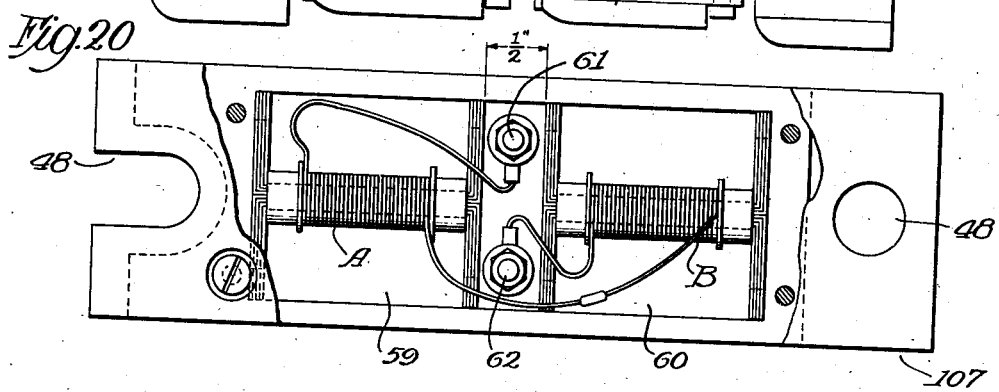
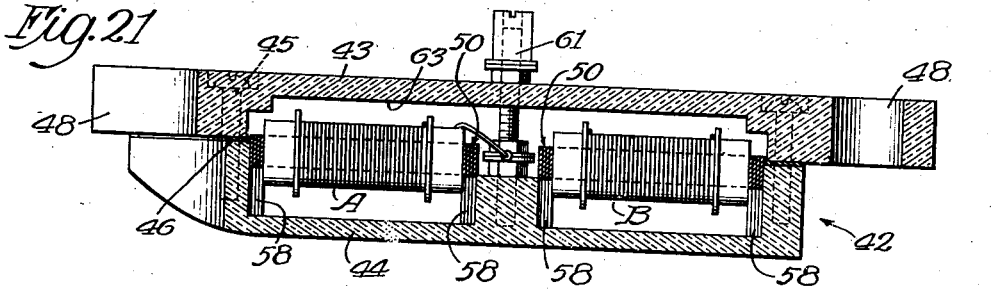
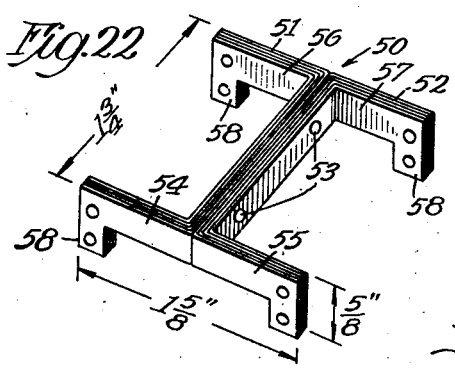
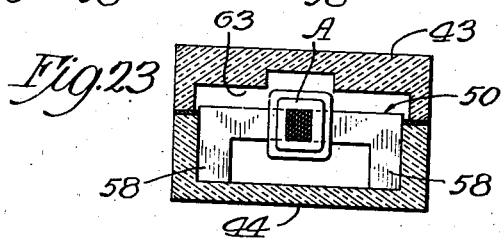

Patented Mar. 1, 1938

2,109,455

UNITED STATES PATENT OFFICE 2,109,455

METHOD AND APPARATUS FOR DETECTING FLAWS IN METALLIC BODIES

Walter C. Barnes, Lake Bluff, and Henry W. Keevil, Highland Park, Ill.

Application April 25, 1934, Serial No. 722,356

7 Claims. (Cl. 175—183)

Many railroads have adopted the practice of periodically testing their track for latent and patent flaws, the latter, of course, being rather easy to find by visual examination, but the former being found only by the use of special equipment. The most common method of checking rails for latent flaws (as well as patent flaws) is to employ a test car which is equipped with brushes for delivering a low voltage high amperage current to the section of the rail over which the car is passing, and a detector coil which moves over the rail through the magnetic field set up by the current. The detector coil is connected with thermionic amplifying apparatus and suitable recording instruments which register the induced electrical impulses in the coil due to variations in the magnetic field surrounding the rail.

If the rail is of uniform density and composition, the magnetic field remains constant, but if the car passes over a section of rail which is in some way imperfect, the magnetic field in the vicinity of the imperfection is distorted and the detector coil will indicate the variation in the magnetic field.

The problem has been to differentiate between certain surface irregularities, such as "corrugations", grease spots, local hardening, etc. which are not of serious consequence, and transverse fissures, which are usually serious. The seriousness of the latter, of course, depends on their size and location.

The present invention provides a novel method, as well as apparatus for eliminating a great number of false indications which are registered on existing equipment. It has been found that transverse fissures generally induce a characteristic type of impulse in the detector coil, and by suitably amplifying and registering this impulse, it is possible to distinguish between true and false indications.

The principal object, therefore, of this invention is to provide a method and apparatus for more accurately depicting the true condition of a rail when traversed by the test car. Obviously, however, the invention may be used in checking flaws in metallic bodies other than rails and the invention is not limited to the specific application of the method and apparatus herein disclosed.

Further and other objects and advantages will become apparent as the disclosure proceeds and the description is read in conjunction with the accompanying drawings, in which—

Fig. 1 is a diagrammatic illustration of one form of the invention;

Fig. 2 is a perspective view showing the relative placement of the detector coils with reference to a rail;

Figs. 3 and 4 are views which will be used in an attempt to explain the reason for certain phenomena known to exist when the detector coils are placed in the manner shown in Fig. 2;

Figs. 5, 6, 7 and 8 are views illustrating the character of some of the impulses which may be induced in the detector coils;

Fig. 9 is a view showing a characteristic curve of a vacuum tube in which grid voltage is plotted against plate current;

Fig. 10 is a diagrammatic view showing a modified form of the invention;

Fig. 11 illustrates a still further modified form of the invention;

Figs. 12 to 17 inclusive are views showing a number of possible variations in the character of the plate current output from the amplifying apparatus;

Fig. 18 is a plan view of the detector shoe support used with the form of the invention shown in Fig. 1;

Fig. 19 is a side, elevational view of the same;

Fig. 20 is a plan view of one of the detector shoes with a portion of the top broken away to show the detector coils and their mounting within the shoe;

Fig. 21 is a longitudinal, vertical, sectional view through the shoe and coils;

Fig. 22 is a perspective view of the core associated with each detector coil; and Fig. 23 is a transverse, sectional view through the shoe and coils.

It will be understood that the specific embodiments of the invention that are illustrated in the drawings and will hereafter be described are merely preferred forms of the invention chosen to facilitate disclosure, and are not to be used to impose limitations upon the appended claims except as may be required by the prior art.

Referring now to Fig. 1, a test car is diagrammatically indicated at 30, and is equipped with a gasoline engine 31 driving a generator 32, which, in turn, supplies direct current of low voltage and high amperage (preferably ½ volt and 2500 amperes) to the rail 33 through brushes 34 and 35, supported at opposite ends of a frame 36. The field of the generator 32 is controlled by an exciter 37, also driven by the engine 31.

Suspended from the frame 36, but insulated therefrom, is a smaller frame 38, which is adapted to ride upon the track 33 and support detectors 39 and 39a in proximity to, but out of contact with, the track 33. The detectors are responsive to the magnetic fields set up by the high amperage current passing through the rail, and whenever they traverse a distorted or non-uniform field, potentials are induced in the coil which are amplified by suitable thermionic apparatus, generally indicated at 40 and 41, the last stages of which operate recording instruments of suitable construction. Preferably, variations in the magnetic field are graphically recorded by the instruments so as to produce a permanent record.

It will be understood that the apparatus suspended from the car underframe, as well as the amplifying and recording apparatus, is duplicated on the opposite sides of the car so that both rails are checked for flaws.

The operating elements of the detectors 39 and 39a are housed within shoes 42, each of which consists of top and bottom blocks 43 and 44 held together by countersunk machine screws 45. Both blocks are preferably made of black linen base bakelite, and have a rubber fabric gasket 46 interposed between the blocks when assembled to form a water tight seal. The shoes are supported from the frame 38 by bolts 47 which pass through apertures 48 provided at both ends of each top block 43.

Two detector coils A and B are mounted in each shoe, and in order to compensate for variations in the current that is applied to the rails, the coils are connected in opposition to each other. As a result, any change in the field strength due to current variations will induce equal and opposite electromotive forces in the coils, and as the coils are connected in opposition, no current will flow.

The coils A and B are each provided with a suitable core piece, generally designated 50, which is preferably H-shaped and comprises two similar U-shaped portions 51 and 52 that are riveted together as indicated at 53. The parts of the two halves which are secured together constitute the actual core of the induction coil, and both ends of the composite core project from the coil and then divide to form laterally extending arms 54, 55, 56 and 57, each of which terminates in a downwardly extending leg portion 58.

It is desirable to have the bridge or actual core which connects the laterally extending arms laminated in longitudinal vertical planes so that it will have greater reluctance to the transverse field than the arms. For the same reason, it may be desirable in some cases to have the arms 54 and 55, and 56 and 57 unlaminated, or if laminated, to have the laminations continuous throughout adjacent arms (54 and 55, and 56 and 57) in order to reduce their reluctance to the magnetic flux.

The coils A and B, with their core pieces, fit within cavities 59 and 60 provided in the bottom block 44 of the detector shoes. The coils are connected in series, as shown in Fig. 20, but are in opposition to one another. Suitable binding posts 61 and 62, secured in the upstanding partition between the cavities 59 and 60, are provided for connecting the coils to the amplifying apparatus shown in Fig. 1.

The upper block 43 of the detector shoes is cored out, as indicated at 63, to accommodate the two coils mounted in the cavities 59 and 60. When the top block 43 is secured to the lower block 44, the two coils are completely enclosed within a weatherproof housing and are, therefore, not subjected to the deteriorating effects of weather conditions.

When a single detector is used, as in Fig. 10, with its longitudinal axis directly over the rail center line, the detector shoe and the coils are preferably dimensioned, as indicated in the drawings, since this particular arrangement has proven satisfactory in service, even to the extent of erasing false indications due to "corrugated" rails.

When two detectors are used, as in Figs. 2, 3, 4, 18 and 19, the shoes 39 and 39a are somewhat similar and are offset so that each pair of coils in the shoes (the coils are correspondingly similar) will cover substantially half of the rail head. In this way, a better coverage of the rail head is obtained, the sensitivity of the apparatus is increased, and more information can be gleaned from the record made by the apparatus.

It will be helpful at this point to analyze briefly the theory which is believed to underlie the present invention. But all theoretical discussion in this specification is to be construed merely as an attempt to explain the advantageous results that are known to flow from practicing the invention in accordance with this disclosure.

Let us suppose that the test car is approaching a section of track in which there is a transverse fissure located in the lower part of the rail head, as shown for example at 64 in Fig. 2. Let us further assume that the fissure 64 due to its location causes an increased amount of current to flow adjacent to the top of the rail, thereby strengthening the magnetic flux above the rail at this point. Then, when the coil A of the front detector shoe 39a enters the denser magnetic field, an electrical impulse will be induced in the coil which, for the purpose of illustration, can be represented, in a general way, by the portion 65 of the curve shown in Fig. 5. As the coil A is leaving the locally increased field, a surge of current flows in the opposite direction through the coil A and this may be represented by the portion 66 of the same curve. For convenience, the portions of the curves above the horizontal line will be termed positive impulses, and those below, negative impulses.

In a similar manner, the passing of the coil B through the increased field will induce a positive and negative impulse in the coil B, but as this coil is oppositely wound with respect to the coil A, the curve is inverted and consists of a positive impulse 67 and negative impulse 68 (Fig. 5).

If the coils A and B are properly spaced with relation to the speed of the car, the curves 66 and 67 will overlap producing a resultant curve 69 which is substantially twice the amplitude of the individual positive impulses. A characteristic impulse is, therefore, obtained when the coils pass through a sharply increased magnetic field.

In Fig. 6, we see the type of impulse that would pass through the detector coil circuit if the coils A and B were spaced so that the positive elements of their induced impulses would not overlap.

Now let us suppose that the fissure 64 instead of being at the base of the rail head were adjacent to the top of the rail head. In such a case, the magnetic field directly above the rail head would be locally weakened and the coil A upon entering this field would induce within itself a surge of current in the opposite direction. The curve which would represent the character of this impulse is shown in Fig. 7, assuming that the coils are spaced so that the impulses from the two coils overlap. If the coils were spaced further apart, or if the car speed be somewhat slower, the current surge through the detector coil circuit would be somewhat as shown in Fig. 8.

Similar conditions of increased and decreased magnetic flux are encountered when the defect or flaw is at one side or the other of the rail head (see Figs. 3 and 4) except that the strengthened and weakened fields are displaced laterally from the rail center line. In any case, the distorted magnetic field in the vicinity of the flaw will produce characteristic impulses in the two sets of coils, and due to the offset relation of the shoes 39 and 39a with respect to the center line of the rail, the two pairs of coils seem to have not only the ability to distinguish transverse fissures from other kinds of defects or irregularities, but also the ability to tell on what side of the rail head the flaw is located.

Before attempting an explanation of this latter phenomena, let us first consider the reason for employing two amplifiers in certain embodiments of the invention. For the sake of convenience, the amplifier 40 will be called the left amplifier, and the amplifier 41, the right amplifier.

Both of the amplifiers are cascade types, resistance coupled, but other types could be employed. Each has four stages of amplification with the output or plate current of the last stage furnishing the electrical energy for operating front contact relays 76, 77, 78 and 79 of the recording apparatus. The input to the amplifiers is through conductors 80 and 81, and 82 and 83, the first two connecting the detector 39 with the left amplifier and the latter two connecting the detector 39a with the right amplifier. It will be observed that the two amplifiers are connected to the two detectors 39 and 39a in the same manner, i. e. like leads from the detectors go to the same parts of the amplifiers.

The recording apparatus includes in addition to the relays 76, 77, 78 and 79, a strip of recording paper 84 moving in the direction of the arrow at a rate proportional to car speed (or if desired, at a constant speed), pens 85, 86, 87 and 88 which can be moved laterally in response to coils 89, 90, 91 and 92, respectively, the former two being connected in parallel with a battery 93, and armatures 94 and 95 of the relays 76 and 77, respectively, and the latter two being connected in parallel with the battery 96 and the armatures 97 and 98, respectively, of relays 78 and 79. The pens inscribe record lines 99, 100, 101, and 102 on the moving strip 84 which, when analyzed, indicate the condition of the rail over which the car is passing.

The relays 76 and 78 are set to operate upon very slight increases of current in the amplifier outputs and the relays 77 and 79 are set to operate only when the increases in current are more substantial. Stated in other words, the relays 76 and 78 have lower pick-up values than the relays 77 and 79, so that the relative size of the rail defects can be gauged to some extent by observing which relays have operated.

The indications that will be recorded by the pens 85, 86, 87 and 88 depend entirely upon the character of the current wave in the amplifier outputs. Since this in turn depends upon certain adjustments of the amplifiers, it will be well at this point to consider the functioning of the two amplifiers.

It is well known that by changing the plate voltage of an amplifier, or by changing the grid bias, it is possible to obtain many variations in the character of the amplified wave impulse. Thus, if we start with a wave of the type shown in Fig. 5, it is possible to obtain a plate current which can be represented by the curves of Figs. 12, 14, or 16, depending upon the various plate voltages which are used and the extent of the grid bias. This will be better understood by referring to Fig. 9 which shows a characteristic plate current curve for an electronic emission tube.

Let us assume that the current impulse of Fig. 5 effects a change in the grid voltage in the amplifier between limits represented by the points 103 and 104. Every variation, therefore, of the detector impulse produces a proportional change in the plate current, and as a result, the plate current may be represented by the curve shown in Fig. 12. Similarly, if the detector impulse of Fig. 7 is put through the amplifier and its effect on the grid voltage stays within the limits of points 103 and 104, the resultant plate current would take on the appearance such as shown in Fig. 13 when the plate current is plotted against time.

Now let us suppose that either the plate voltage is decreased, or that the grid bias is extended so as to in effect move the curve of Fig. 9 to the dotted line position C. Under these circumstances, the negative portions of the detector impulses are wiped out and only the positive portions of the curve are recorded by the plate current, that is the portion 69 for the curve of Fig. 5. As a result, the plate current would record a single positive impulse (Fig. 14) for the detector impulse of Fig. 5, or two positive impulses (Fig. 15) for the input wave of Fig. 7.

In the same manner that the curve of Fig. 9 may be moved to the right by making the grid more negative, or by decreasing the plate voltage, it may also in effect be moved to the left, as shown by the dotted line position D, by increasing the plate voltage, or by making the grid more positive. Under these circumstances, the positive portions of the input waves are wiped out and only the negative portions remain. This is illustrated in Figs. 16 and 17 for wave inputs corresponding to Figs. 5 and 7, respectively.

With the above explanation in mind, it is obvious that a variation in the plate current corresponding to Figs. 12 or 14, will so actuate the relays 76 and 77, or 78 and 79 so as to produce a single jog 105 in the record lines. Similarly, variations in the plate current corresponding to Figs. 13 or 15 will produce a double jog 106 in the record lines.

Tests have proven that when the detectors 39 and 39a are arranged with respect to the rail, as shown in Figs. 1, 2, 3, 4, 18 and 19, and are connected to left and right amplifiers, respectively, as shown in the drawings, a true transverse fissure will usually cause a single jog 105 to be recorded in the line 99, or in lines 99 and 100, and a double jog 106 in the line 101, or lines 101 and 102, or vice versa (both recordings being shown on the record strip 84).

The record line, or lines, which show a single jog, and the line or lines which show a double jog are determined by the position of the flaw with respect to the rail head, as previously described. In this manner, the record indicates not only that a transverse fissure has been traversed, but also on which side of the rail, the transverse fissure is located.

In one sense, the functioning of the apparatus is merely to amplify and register the entire wave impulse that is sent through the detector coil or coils, and by analysis of the amplified impulse, it is possible to obtain much information concerning the nature and location of the flaw.

In the form of the invention shown in Fig. 1, the left and right amplifiers record the condition of the magnetic field on opposite sides of the rail center line. In the modified form of the invention shown in Fig. 10, only one detector 107 is used (consisting of coils A and B as before), and it is placed along the center line of the rail. The detector is connected to the left amplifier by conductors 108 and 109, and conductors 110 and 111, and to the right amplifier by conductors 108 and 112, and conductors 110 and 113. It will be observed that the connections between the two amplifiers and the detector are reversed with respect to each other, i. e. the conductors 108 and 109 go to the filament of the first tube in the left amplifier, whereas the conductors 108 and 112 lead to the grid of the right amplifier. In a similar manner, the conductors 110 and 112 lead to the grid of the left amplifier, but the conductors 110 and 113 go to the filament of the right amplifier. In this manner, the impulse induced in the detector coil is sent through one of the amplifiers in inverted form, as will be understood by reference to Figs. 12 through 17 inclusive.

Thus, the single and double jogs in the record lines are produced as before, but they must be interpreted somewhat differently because of the use of only one detector. The previous explanation concerning the probable character of the field when flaws are encountered along the rail center line but at different heights, will furnish a guide for an interpretation of the record produced by the form of the invention shown in Fig. 10.

The illustrative embodiments of the invention which have been described thus far have employed front contact relays in the plate circuit of the last stage of amplification. Obviously back contact relays could be used as well, either alone, or in combination with front contact relays. A schematic diagram of an apparatus employing both front and back contact relays is shown in Fig. 11 in which relays 114 and 115 are the back contact relays, and 116 and 117 are the front contact relays. In this combination of relays, only one amplifier is necessary provided the adjustment is such that the entire wave is amplified so that plate current variations of the character shown in Figs. 12 and 13 are produced. Under these circumstances, the back contact relays 114 and 115 will record the decreases in the plate current, and the front contact relays 116 and 117, the increases in the plate current.

The method and apparatus of this invention is susceptible of many variations, and the embodiments of the invention which have been described merely illustrate some of the more practical applications of the invention.

What we claim, therefore, is:—

1. The method of detecting flaws in metallic bodies which consists in passing a strong electrical current through the body, exploring the magnetic field surrounding the body with one or more coils moved parallel to the general direction of current flow through the body, and arranged so that a local distortion of the magnetic field will induce a positive and negative electrical impulse in the coil or coils, sending the impulse through apparatus for amplification, simultaneously sending the impulse in inverted form through other apparatus for amplification, and registering the output of the two amplifiers for comparison and analysis.

2. Apparatus for detecting flaws in metallic bodies through which a strong current is being passed, said apparatus comprising a pair of coils connected in series and oppositely wound, adapted to be moved relative to the body under test and in proximity thereto, said coils being spaced so that for a given rate of movement a portion of the electrical impulse induced in one of the coils by a distorted magnetic field overlaps and magnifies the corresponding portion of the impulse induced in the other coil by the same distortion, and means for amplifying and registering at least a part of both the positive and negative elements of the impulse, said means including a marker adapted to record the positive element of the impulse, and a separate and distinct marker adapted to record the negative element of the impulse.

3. Apparatus for detecting flaws in metallic bodies having a magnetic field in proximity to the body, said apparatus comprising a coil arranged so that when moved along the body an electrical impulse consisting of positive and negative components will be induced in the coil when the latter passes through the magnetic field in the vicinity of a flaw, and means for registering for observation at least portions of both positive and negative components of the impulse, said means including a moving tape and separate markers for the positive and negative impulses.

4. Apparatus for detecting flaws in metallic bodies having a magnetic field in proximity to the body, said apparatus comprising a coil arranged so that when moved along the body an electrical impulse consisting of positive and negative components will be induced in the coil when the latter passes through the magnetic field in the vicinity of a flaw, and means for registering for observation at least portions of both positive and negative components of the impulse, said means comprising front and back contact relays.

5. Apparatus for detecting flaws in metallic bodies having a magnetic field in proximity to the body, said apparatus comprising a coil arranged so that when moved along the body an electrical impulse consisting of positive and negative components will be induced in the coil when the latter passes through the magnetic field in the vicinity of a flaw, and means for registering for observation at least portions of both positive and negative components of the impulse, said means including duplicate amplifying apparatus, one being adapted to amplify the impulses in normal form and the other being adapted to amplify the impulses in inverted form.

6. Apparatus for detecting flaws in metallic bodies having a magnetic field in proximity to the body, said apparatus comprising a coil arranged so that when moved along the body an electrical impulse consisting of positive and negative components will be induced in the coil when the latter passes through the magnetic field in the vicinity of the flaw, and means for registering for observation at least portions of both positive and negative components of the impulse, said means including duplicate amplifying apparatus, one being adapted to amplify the impulses in normal form and the other being adapted to amplify the impulses in inverted form, and relays operated from the output of said amplifiers.

7. In apparatus for detecting flaws in metallic bodies having a magnetic field in proximity to the body, said apparatus comprising a coil positioned on one side of the body center line and arranged so that when moved along the body an electrical impulse consisting of positive and negative components will be induced in the coil when the latter passes through the magnetic field in the vicinity of a flaw, a second coil, staggered with respect to the first, and positioned on the other side of the body center line and arranged so that when moved along the body, an electrical impulse consisting of positive and negative impulses will be induced in said second coil when the latter passes through the magnetic field in the vicinity of said flaw, means including an amplifier, a moving tape and a marker operated from the amplifier for registering the impulses from said first-named coil, and means including a second amplifier, a moving tape and a second marker operated from the second amplifier for separately registering the impulses from the said named coil for comparison and analysis with the recording on the tape produced by the first-named coil and marker.

WALTER C. BARNES.
HENRY W. KEEVIL.